United States Patent
Christ et al.

(10) Patent No.: US 10,464,414 B2
(45) Date of Patent: Nov. 5, 2019

(54) WORKING MACHINE WITH POWER-BRANCHING DRIVE

(71) Applicant: Liebherr-Components Biberach GmbH, Biberach an der Riβ (DE)

(72) Inventors: Clemens Christ, Biberach (DE); Viktor Schindler, Uttenweiler (DE); Norbert Hausladen, Biberach (DE)

(73) Assignee: LIEBHERR-COMPONENTS BIBERACH GMBH, Biberach an der Riss (DE)

( * ) Notice: Subject to any disclaimer, the term of this patent is extended or adjusted under 35 U.S.C. 154(b) by 96 days.

(21) Appl. No.: 15/570,285

(22) PCT Filed: Apr. 25, 2016

(86) PCT No.: PCT/EP2016/000663
§ 371 (c)(1),
(2) Date: Oct. 27, 2017

(87) PCT Pub. No.: WO2016/173706
PCT Pub. Date: Nov. 3, 2016

(65) Prior Publication Data
US 2018/0141435 A1    May 24, 2018

(30) Foreign Application Priority Data

Apr. 27, 2015 (DE) .................... 20 2015 003 054 U
Jun. 24, 2015 (DE) .................... 20 2015 004 528 U

(51) Int. Cl.
*B60K 17/28* (2006.01)
*F16H 47/04* (2006.01)
(Continued)

(52) U.S. Cl.
CPC .............. *B60K 17/28* (2013.01); *B60K 25/02* (2013.01); *B60K 25/06* (2013.01); *F16H 3/72* (2013.01);
(Continued)

(58) Field of Classification Search
CPC ........ B60K 17/28; B60K 25/02; B60K 25/06; B60K 2025/065; B60K 2025/026;
(Continued)

(56) References Cited

U.S. PATENT DOCUMENTS 3,538,790 A   11/1970   Polak
3,597,998 A   8/1971   Heinrich
(Continued)

FOREIGN PATENT DOCUMENTS

DE    198 12 500 A1    9/1999
DE    10 2012 006 189 A1    10/2013
WO    2009/071060 A3    6/2009

OTHER PUBLICATIONS

International Search Report and Written Opinion of the International Searching Authority for International Patent Application No. PCT/EP2016/000663 dated Aug. 3, 2016.
(Continued)

*Primary Examiner* — Darlene P Condra
(74) *Attorney, Agent, or Firm* — Troutman Sanders LLP; Ryan Schneider

(57) ABSTRACT

A working machine including a working assembly that can be driven by an engine, with the engine being connectable to the working assembly via a power branching transmission including a first mechanical power branch and a second electric or hydraulic power branch, the first and second power branches being combined by a summation transmission that can be coupled to the working assembly on the output side and provides a variable transmission ratio
(Continued)

between the first mechanical power branch and the working assembly that can be adjusted by the rotational speed of the second electric or hydraulic power branch. A blocking device is provided for blocking the variability of the transmission ratio that can be adjusted between the first mechanical power branch and the output side of the summation transmission by the rotational speed of the second electric or hydraulic power branch.

40 Claims, 6 Drawing Sheets

(51) Int. Cl.
    *B60K 25/06*     (2006.01)
    *F16H 3/72*     (2006.01)
    *B60K 25/02*     (2006.01)
    *E01C 23/088*     (2006.01)
    *F16H 37/08*     (2006.01)

(52) U.S. Cl.
    CPC ............ *F16H 3/721* (2013.01); *F16H 47/04* (2013.01); *B60K 2025/022* (2013.01); *B60K 2025/026* (2013.01); *B60K 2025/065* (2013.01); *B60Y 2200/15* (2013.01); *B60Y 2200/41* (2013.01); *E01C 23/088* (2013.01); *F16H 2037/088* (2013.01)

(58) Field of Classification Search
    CPC ..... B60K 2025/022; F16H 3/72; F16H 3/721; F16H 47/04; F16H 2037/088; B60Y 2200/15; B60Y 2200/41; E01C 23/088
    See application file for complete search history.

(56) References Cited

U.S. PATENT DOCUMENTS

| | | | |
|---|---|---|---|
| 4,750,381 A | | 6/1988 | Kita et al. |
| 4,774,855 A | * | 10/1988 | Murrell ................ B63J 3/02 475/31 |
| 2003/0036451 A1 | | 2/2003 | Weeramantry et al. |
| 2008/0085802 A1 | * | 4/2008 | Rauschenbach ....... A01D 69/03 475/83 |
| 2008/0103006 A1 | * | 5/2008 | Pollman ................ F16H 47/04 475/72 |
| 2014/0018201 A1 | * | 1/2014 | Tolksdorf ............... F16H 47/04 475/83 |
| 2015/0091363 A1 | * | 4/2015 | Reuter .................. B60K 25/02 299/10 |

OTHER PUBLICATIONS

Search Report issued by the German Patent and Trademark Office (DPMA) for German Patent Application No. 20 2015 004 528.6 dated Jul. 23, 2015.

\* cited by examiner

WORKING MACHINE WITH POWER-BRANCHING DRIVE

CROSS-REFERENCE TO RELATED APPLICATIONS

This is a § 371 national stage of International Application PCT/EP2016/000663, with an international filing date of 25 Apr. 2016, which claims the benefit of both DE Patent Application Serial No. 20 2015 003 054.8, filed on 27 Apr. 2015, and DE Patent Application Serial No. 20 2015 004 528.6, filed on 24 Jun. 2015, the benefits of the earlier filing dates of which are hereby claimed under 35 USC § 119(a)-(d) and (f). The entire contents and substance of all applications are hereby incorporated by reference.

BACKGROUND OF THE INVENTION

1. Field of the Invention

The present invention relates to a working machine, in particular in the form of a surface cutter, having a working assembly that is drivable by an engine, wherein the engine can be connected to the working assembly via a power split transmission comprising a mechanical first power branch and an electric or hydraulic second power branch and wherein the first and second power branches are combined by a summation transmission that is couplable to the working assembly at the output side and that provides a variable transmission ratio between the mechanical first power branch and the working assembly that can be set by the rotational speed of the electric or hydraulic second power branch.

2. Description of Related Art

With surface cutters such as asphalt cutters or mining muck removal equipment such as surface miners, but also with other construction machinery or, for example, large snow blowers, diesel engines or internal combustion engines in general or occasionally also electric motors are readily used to drive the working assembly, in particular when the working machine is configured as travelable or as self-driving since here the internal combustion engine can serve as a traction drive, on the one hand, and the energy supply is also unproblematic in a mobile use, on the other hand. With small travel paths or also in electrified mining or surface mining applications, electric motors are also occasionally used that are supplied by a wiring. Since the working assemblies are often operated at a constant working speed or rotational speed or in an only limited rotational speed window or working speed window, the working assembly is directly coupled to the internal combustion engine at a fixed transmission ratio, with a clutch naturally being able to be provided here for coupling and decoupling the working assembly to/from the internal combustion engine, for example to facilitate the starting of the internal combustion engine and to be able to switch off the working assembly.

On such a linking of the working assembly to the internal combustion engine with a fixed transmission, the rotational speed or the working speed of the working assembly is controlled by changing the rotational speed of the internal combustion engine, which is sufficient in many cases, but is also sometimes subject to disadvantages. When the internal combustion engine simultaneously serves as a traction drive and the travel speed does not necessarily have to be coupled to the rotational speed of the working assembly, an additional, typically continuous, traction drive transmission is required here. On the other hand, the internal combustion engine is also often operated in a rotational speed range in which the torque of the internal combustion engine and/or its efficiency drops more or less considerably.

To provide a remedy here, document DE 10 2012 006 189 A1 proposes linking the internal combustion engine to the working assembly via a power split transmission, wherein one portion of the drive power is transmitted via a mechanical drive train and another portion of the drive power is transmitted via an electric or hydraulic second power branch. The two power branches are combined in a summation transmission formed as a planetary gear that makes it possible to vary the transmission ratio between the mechanical power branch and the output side of the summation transmission by an adjustment of the rotational speed of the electric or hydraulic converter so that the working speed or the rotational speed of the working assembly can be varied with respect to the rotational speed of the internal combustion engine.

This spread between the internal combustion engine rotational speed and the working assembly working speed achieved by the power split and the summation transmission makes it possible, for example with a surface cutter, for example an asphalt cutter, in so-called finish-cutting—for example on cutting off a top tar layer—to operate at a very high rotational speed and thus to generate a correspondingly high cutting speed at the rotary cutter, whereas, for example, during roughing, a lower rotation speed can be set at a simultaneously high torque and thus a small cutting speed of the rotary cutter to increase the removal amount and simultaneously to require a smaller energy input since very large slabs break out from the top tar layer. On the other hand, it is also possible by the power split to run higher output torques at smaller rotor rotational speeds or working speeds of the working assembly since the output torque is not directly dependent on the internal combustion engine characteristic.

Despite the reduced working speed of the working assembly, the internal combustion engine can be operated in a rotational speed range of a favorable torque and thus at a high power, whereby, for example, the roughing can be carried out with surface cutters at smaller rotary cutter rotational speeds or cutting speeds. Less power is hereby required at the working assembly, which can in turn lower the fuel consumption of the internal combustion engine. On the other hand, higher rotational speeds can also be set at the cutter rotor by the power split and the spread thus achieved. The full power can, however, be provided over a wide rotational speed band.

On the other hand, efficiency losses, that arise in the hydraulic second power branch due to hydraulic losses such as drag losses, leaked oil losses and the like, occur due to the power split. The energy consumption thus increases compared with a purely mechanical direct drive of the working assembly at a fixed transmission, at least when the load spectrum is observed in which the internal combustion engine operates in a rotational speed range favorable for torque and consumption. This load spectrum can, for example, make up a very large proportion of the total operating time of the working machine in a surface cutter if it is assumed that a lot of work typical for the respective working machine is carried out in a standard operating state. For example, with an asphalt cutter a lot of work is carried out at a standard rotational speed of the rotary cutter that can be mapped in a rotational speed range of the internal combustion engine favorable for torque and consumption at a fixed transmission.

Advantages in consumption and power that can be achieved for different specific operating ranges using a power split are acquired to this extent by a loss of efficiency and an accompanying increase in consumption in the standard operating range.

SUMMARY OF THE INVENTION

It is the underlying object of the present invention to provide an improved working machine of the initially named kind that avoids disadvantages of the prior art and further develops the latter in an advantageous manner. Special tasks should in particular be able to be carried out at highly increased or decreased work speeds of the working assembly in a rotational speed range of the internal combustion engine favorable for torque and/or consumption without acquiring it by a loss of efficiency and disadvantages for consumption with standard tasks.

The named object is achieved in accordance with the invention by a working machine, in particular in the form of a surface cutter, having a working assembly that is drivable by an engine, in particular an internal combustion engine, wherein the engine is configured to be connected to the working assembly via a power split transmission comprising a mechanical first power branch and an electric or hydraulic second power branch, wherein the first and second power branches are combined by a summation transmission that is couplable to the working assembly at the output side, wherein a variable transmission ratio between the mechanical first power branch and the output side is configured to be set by a summation transmission input rotational speed that is configured to be provided by the electric or hydraulic second power branch, characterized in that a blocking apparatus is provided for blocking the variability of the transmission ratio by the electric or hydraulic second power branch.

It is therefore proposed to configure the electric or hydraulic power branch of the power split between the main engine and the working assembly as switchable in and out so that the electric and/or hydraulic power split is only able/has to be used when it is actually required. The power split can be deactivated for standard work that can be carried out at a fixed transmission in a rotational speed range of the main engine favorable for torque and/or consumption so that the working assembly can be driven solely via the mechanical branch, with a mechanical drive train between the main engine and the working assembly being able to have a fixed transmission ratio and with losses in the hydraulic or electric power branch being able to be avoided or at least significantly reduced.

In accordance with the invention, a blocking apparatus is provided for blocking the variability of the transmission ratio of the summation transmission that is adjustable between the mechanical first power train and the output side of the summation transmission by the rotational speed of the electric or hydraulic second power train. If the variability of the transmission ratio is blocked by the electric or hydraulic second power train, the mechanical power branch is directly connected through to the output side of the summation transmission and thus to the working assembly at a fixed rotational speed so that the full drive power is transmitted purely mechanically from the internal combustion engine or main engine to the working assembly and losses arising in the electric or hydraulic second power branch can be avoided. The electric or hydraulic power branch is no longer needed to be able to transfer power over the mechanical branch through the summation transmission to the working assembly. The drive connection between the internal combustion engine or main engine and the working assembly is therefore configured as changeable and is designed to able to be switched over from a power split to a fixed transmission.

The hydraulics of the power split can in particular be taken out of the drive train by the blocking apparatus so that then only the pump at the pump transfer case can co-rotate when idling. The efficiency is thereby improved. The efficiency of the drive train can be considerably improved by blocking the additional power flow by at least one mechanical, loss-free blocking apparatus because in this case the hydraulic power flow is no longer required. The arising leaked oil losses and mechanical losses to maintain the hydraulic pressure, also at a standstill (stop), thus no longer come into effect. Energy can thus be saved.

Furthermore, on a defect in the hydraulics, the machine can continue to work with a closed blocking apparatus, with the working assembly then admittedly only being able to be operated at the rotational speeds of the direct drive, but with the cutter work being able to be completed at the construction site, which is usually time-critical, as with a closing of a highway.

The bridging of the electric or hydraulic second power branch can generally take place in different manners. In a further development of the invention, the blocking apparatus can comprise a holding apparatus by means of which the power input train or generally a train of the summation transmission to which the electric or hydraulic second power branch is connected can be fixed and/or can be fixedly coupled to a power train to which the mechanical first power branch is connected. It can be the summation transmission input train to which the mechanical first power branch is drive-connected or it can also be a different transmission element of the summation transmission to which the mechanical first power branch is connected to block the variability of the transmission ratio by the fixed coupling.

The power split can be deactivated and/or the electric or hydraulic second power branch can be bridged by the holding apparatus in that a transmission element that serves the adjustment of the transmission ratio between the mechanical power branch and the output side and that is rotationally fixedly connected to the electric or hydraulic second power branch is fully stopped or is fixedly connected to the power train that is driven from the mechanical first power branch. The power acting in the second power branch can be adjusted to zero or can be lowered, since it is no longer needed, by blocking the degree of freedom of the power input train to which the second power branch is connected. The total drive power is transferred via the mechanical first power branch into the summation transmission and from the internal combustion engine to the working assembly.

The holding apparatus can comprise in a further development of the invention a brake that can directly or indirectly stop a transmission element drivable from the second power branch. Such a brake can directly engage at the transmission element to be blocked or can act on it via a further transmission element connected thereto. The brake can, for example, fix the transmission element in place at a transfer case section so that the transmission element can no longer be rotated.

The brake can be configured differently here, for example in the form of a multi-disk brake or of a different friction brake. Alternatively, a brake acting with shape matching can also be provided, for example in the form of a claw brake or of a jaw clutch, with the help of which the transmission element can be stopped. Alternatively, or additionally to such a jaw clutch, provision can also be made to fix the transmission element by a different connection, preferably a releasable connection, for example to a housing part or to a different component. A fixed transmission drive can hereby be implemented according to the modular principle with an otherwise unchanged construction with which the power split can be omitted if a user or a customer wishes.

Losses in the region of the electric or hydraulic energy converter connected to the power input train can be fully avoided by a complete stopping thereof since it no longer rotates in the stopped state and thus no longer generates any losses.

In an alternative further development of the invention, the holding apparatus can also comprise a clutch by means of which the power input train that is drivable from the electric or hydraulic power branch can be fixedly coupled to the other power input train that is drivable from the mechanical power branch so that the two power input trains rotate with one another or rotate at a fixed rotational speed ratio with respect to one another. The clutch can here provide a direct rotationally fixed connection to the two power input trains to one another so that the two power input trains rotate synchronously with one another.

Alternatively, the clutch can also have a connection of the power input train to which the electric or hydraulic second power branch is connected at a fixed rotational speed to another transmission element that rotates at reduced rotational speed or at increased rotational speed with respect to the power input train to which the mechanical first power branch is connected.

On such a coupling at a fixed rotational speed of the power input train connected to the hydraulic or electric second power branch, the electric or hydraulic energy converter connected thereto co-rotates at a corresponding rotational speed, with the energy converter, however, being able to be operated when idling to minimize drag losses or rotational resistances.

The blocking apparatus for blocking the variability of the transmission ratio or for bridging the electric or hydraulic second power branch can advantageously be integrated into the summation transmission. The brake and/or clutch can in particular be arranged in the interior of the transmission housing of the summation transmission.

The summation transmission can be of different designs, with a planetary gear being able to be provided as a summation transmission in accordance with an advantageous embodiment of the invention, with the planetary gear being able to be configured as single-stage or multi-stage.

The two power branches of the power split can in this respect generally be led into the planetary transmission in different manners. In an advantageous further development of the invention, the mechanical first power branch can drive a web of the planetary transmission at which planet gears are rotatably supported, with a power input shaft driven by the internal combustion engine directly being able to be the web or, in an alternative further development of the invention being able to drive the web via a transmission stage, for example in the form of a spur gear stage. Such a transmission stage or spur gear stage can be advantageous, for example, to be able to provide the power input shaft eccentrically or off-center.

The electric or hydraulic second power branch can go to the sun gear of the planetary stage, with a second power input shaft drivable by the electric or hydraulic energy converter being able to be directly connected to the sun gear or being able to drive the sun gear while interposing a transmission stage, for example in the form of a spur gear stage.

The ring gear driven by the planetary gears can form the output side of the planetary stage and can directly drive the working assembly, for example be directly connected to the rotary cutter of the surface cutter. Alternatively, the ring gear can form the input shaft of a second planetary stage and/or can be connected to an output shaft that forms the input shaft of a further transmission stage.

The brake by means of which the second power input shaft that can be driven by the electric or hydraulic energy converter can be stopped can, in a further development of the invention, directly stop the sun gear or can stop a further transmission element rotationally fixedly connected thereto, for example a spur gear of a spur gear stage that is fixedly connected to the sun gear.

If the blocking apparatus comprises a clutch for blocking the two power input shafts with respect to one another, the clutch can, for example, couple the sun gear rotationally fixedly to the web that is driven by the internal combustion engine or by the mechanical first power branch driven thereby so that the mechanical first branch drives both the web and the sun gear of the planetary gear stage. The mechanical drive train is then switched through to the ring gear and thus to the output side of the summation transmission at a fixed transmission.

The invention will be explained in more detail in the following with respect to preferred embodiments and to associated drawings. There are shown in the drawings.

DETAIL DESCRIPTION OF THE INVENTION

Figure 1:
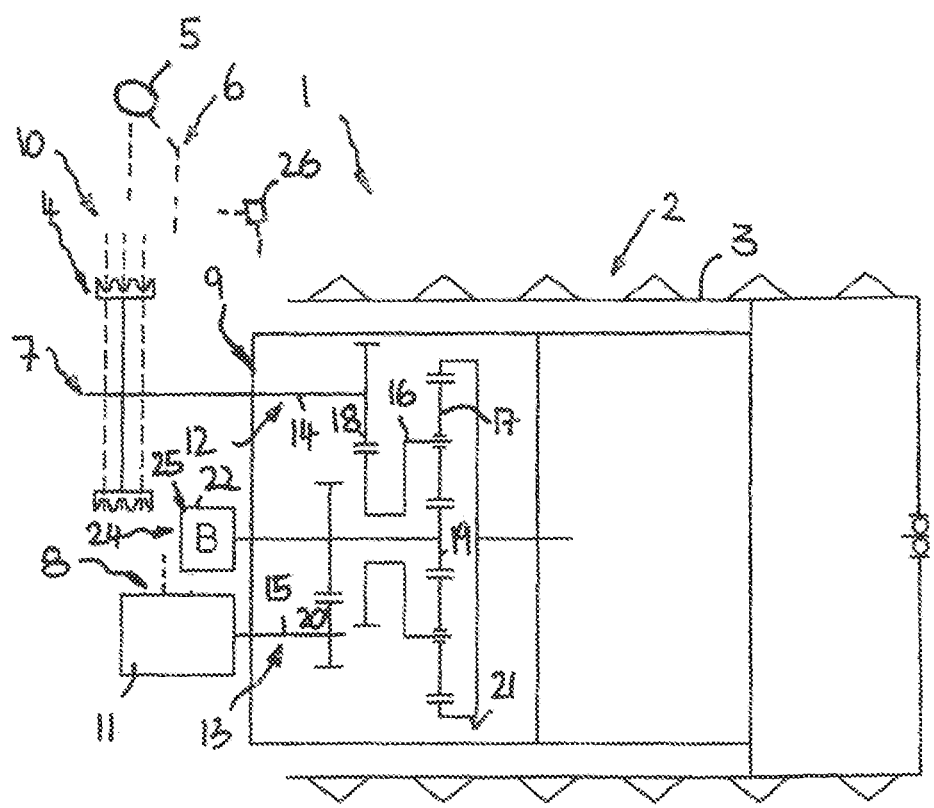
FIG. 1 is a sectional, schematic representation of the rotary cutter of a surface cutter and of the summation transmission provided therein that has two power input trains of which one can be stopped by a directly connected brake and the other is connected to a mechanical drive train and to an internal combustion engine connected thereto.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways.

As used in the specification and the appended Claims, the singular forms "a," "an" and "the" include plural references unless the context clearly dictates otherwise. For example, reference to a component is intended also to include a composition of a plurality of components. References to a composition containing "a" constituent is intended to include other constituents in addition to the one named.

In describing exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed as from "about" or "approximately" or "substantially" one value and/or to "about" or "approximately" or "substantially" another value. When such a range is expressed, other exemplary embodiments include from the one value and/or to the other value.

Similarly, as used herein, "substantially free" of something, or "substantially pure", and like characterizations, can include both being "at least substantially free" of something, or "at least substantially pure", and being "completely free" of something, or "completely pure".

"Comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The characteristics described as defining the various elements of the invention are intended to be illustrative and not restrictive. For example, if the characteristic is a material, the material includes many suitable materials that would perform the same or a similar function as the material(s) described herein are intended to be embraced within the scope of the invention. Such other materials not described herein can include, but are not limited to, for example, materials that are developed after the time of the development of the invention.

The working machine 1 shown only sectionally and schematically in the figures can comprise as a working assembly 2 a rotationally drivable working rotor 3 that can, for example, be the rotary cutter of a surface cutter such as of an asphalt cutter. The working rotor 3 can in this respect—roughly speaking—have a cylindrical, elongate and/or tubular rotor body to which outer periphery working tools such as cutter chisels can be arranged.

The working rotor 3 can be driven from an internal combustion engine 5 only schematically indicated that can simultaneously also drive another auxiliary assembly of the working machine 1 and/or can also serve as a traction drive of the working machine 1 when the working machine 1 is configured as self-propelling. The internal combustion engine 5 can optionally also be a different engine or motor, for example an electric motor, when permitted by the energy supply.

The engine, in particular the internal combustion engine 5, can in this respect be connected to the working rotor 3 via a power split transmission 6, with the power split transmission 6 being able to comprise at least one mechanical first power branch 7 and one electric or hydraulic second power branch 8. The two power branches 7 and 8 are combined in a summation transmission 9 that can advantageously be received in an inner rotor space surrounded by the working rotor 3.

The first mechanical power branch 7 can be a mechanical drive train that can be connected to the crankshaft of the internal combustion engine 5 directly or while interposing one or more transmission stages 10. As FIG. 1 shows, the transmission stage 10 can, for example, comprise a belt or chain stage 4. The mechanical power train that forms the first power branch 7 can here also comprise a clutch to be able to couple and decouple the internal combustion engine 5 to and from the working assembly 2.

The electric or hydraulic second power branch 8 comprises at least one electric or hydraulic energy converter 11 that converts electric or hydraulic drive energy into a mechanical, in particular rotary, drive movement. With an electric power split, the energy converter 11 can be an electric motor. With a hydraulic configuration of the energy converter 11, the latter can be a preferably adjustable hydrostat or a hydraulic motor, for example in the form of an adjustable inline motor/axial piston motor, but with different converter configurations also being possible.

The electric or hydraulic supply of the energy converter 11 can take place by an electric generator or by a hydraulic pump that is not separately shown, with the generator or the pump being able to be driven by the internal combustion engine 5.

To be able to combine the two the power branches 7 and 8 in the summation transmission 9, the summation transmission 9 can comprise two power input trains 12 and 13 to which the mechanical drive train coming from the internal combustion engine 5, on the one hand, and the energy converter 11, on the other hand, are rotationally fixedly connected. In this respect, a permanent rotationally fixed connection can be provided or a clutch can be interposed to be able to decouple the mechanical drive train and/or the energy converter from the summation transmission 9. The power input trains as power input elements to which the power branches 7 and 8 are connected can have a power input shaft or also a power input pinion or a gear wheel that conducts the input power into the transmission in which then the two incoming powers are summed.

As FIG. 1 shows, the summation transmission 9 can be configured as a planetary transmission, with the planetary transmission being able to be single-stage or multi-stage.

As FIG. 1 shows, a first power input shaft 14 that can be connected to the mechanical first power branch 7 can drive a web 16 of the planetary transmission that can carry a plurality of planetary gears 17. The first power input shaft 14 can drive the web 16 via a spur gear stage 18 here, but can optionally also be formed directly by the web 16.

The second power input shaft 15 can drive a sun gear 19 of the planetary transmission, with the sun gear 19 being able to be directly connected to the second input shaft 15 or being able to be connected thereto while interposing a spur gear stage 20.

As FIG. 1 shows, the planetary gears 17 that are rotatably supported at the web 16 and that mesh with or are in cutting engagement with the sun gear 19 drive a ring gear 21 of the planetary transmission that can form the output side of the planetary transmission. The ring gear 21 can be directly connected to the working rotor 3 or can alternatively also form the input shaft of a further planetary transmission stage that can then be connected to the working rotor 3 at the output side. The summation transmission can optionally be connected by a clutch to the working rotor 3 to be able to decouple it from the drive train for servicing purposes, for example.

Figure 2:
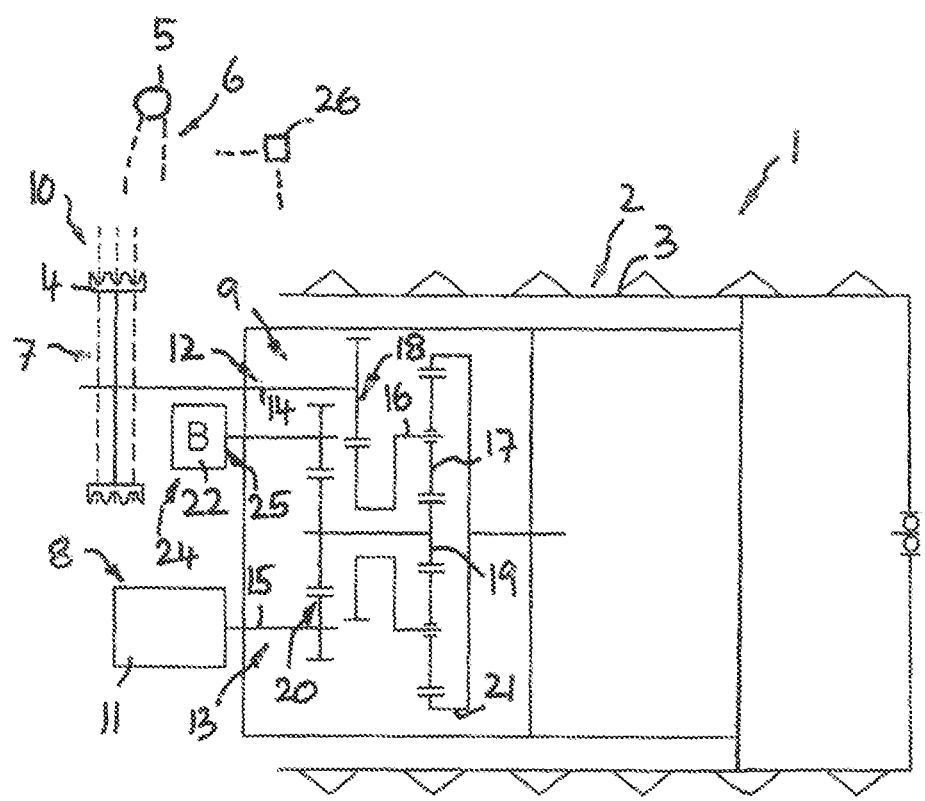
FIG. 2 is a sectional, schematic representation of the rotary cutter of a surface cutter similar to FIG. 1, with a brake for stopping one of the two power input trains of the summation transmission being indirectly connected to this power input train via a transmission stage.

The sun gear 19 can be stopped by a brake 22 that can hold the sun gear 19, for example to a transmission case of the summation transmission 9. The brake 22 can here act directly on the sun gear 19, as FIG. 1 shows, or can act indirectly on the sun gear 19, for example while interposing a transmission stage that can be a spur gear stage, as FIG. 2 shows.

Figure 5:
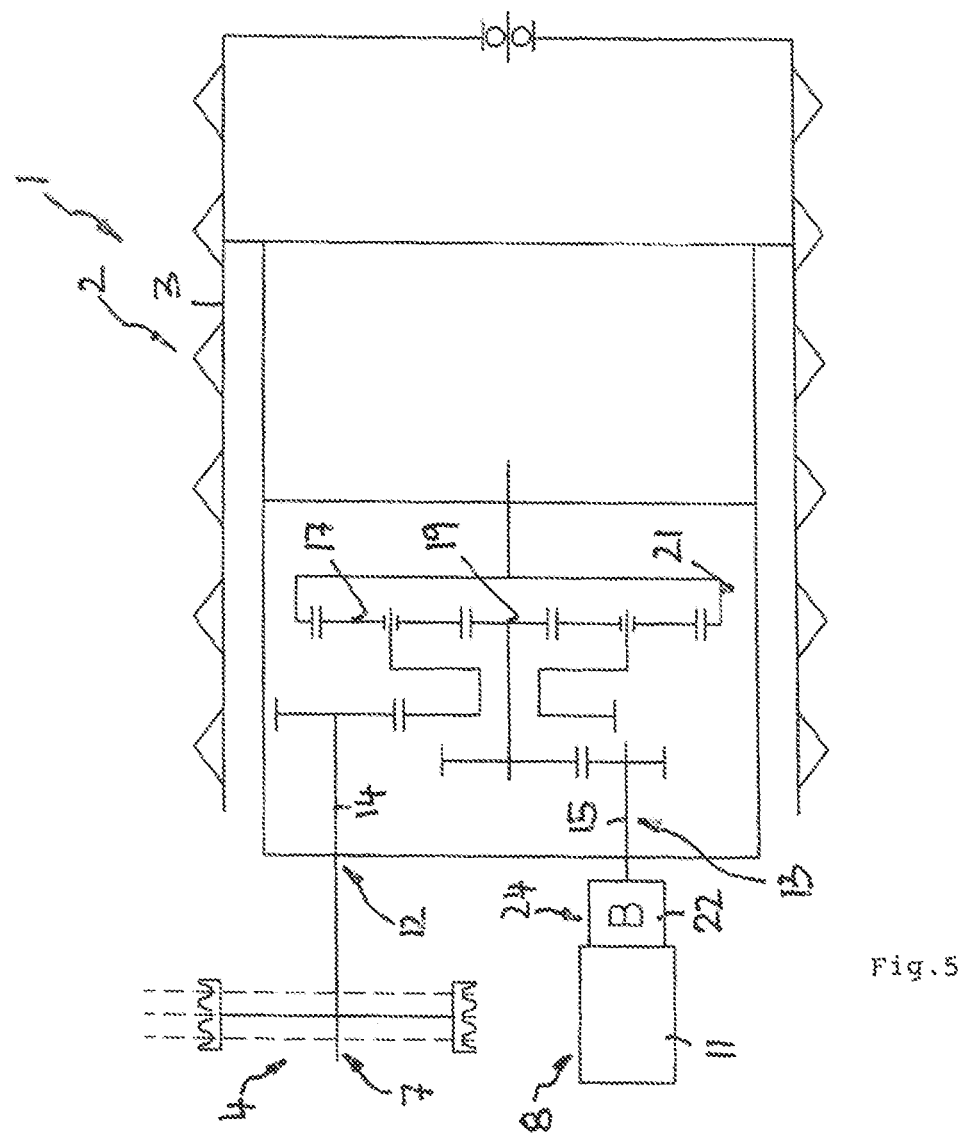
FIG. 5 is a sectional, schematic representation of the rotary cutter of a surface cutter similar to FIG. 1, with a brake for stopping the summation transmission train drive-connected to the electric or hydraulic power branch being connected to the energy converter of the electric or hydraulic power branch or to the summation transmission input shaft connected thereto.
Figure 6:
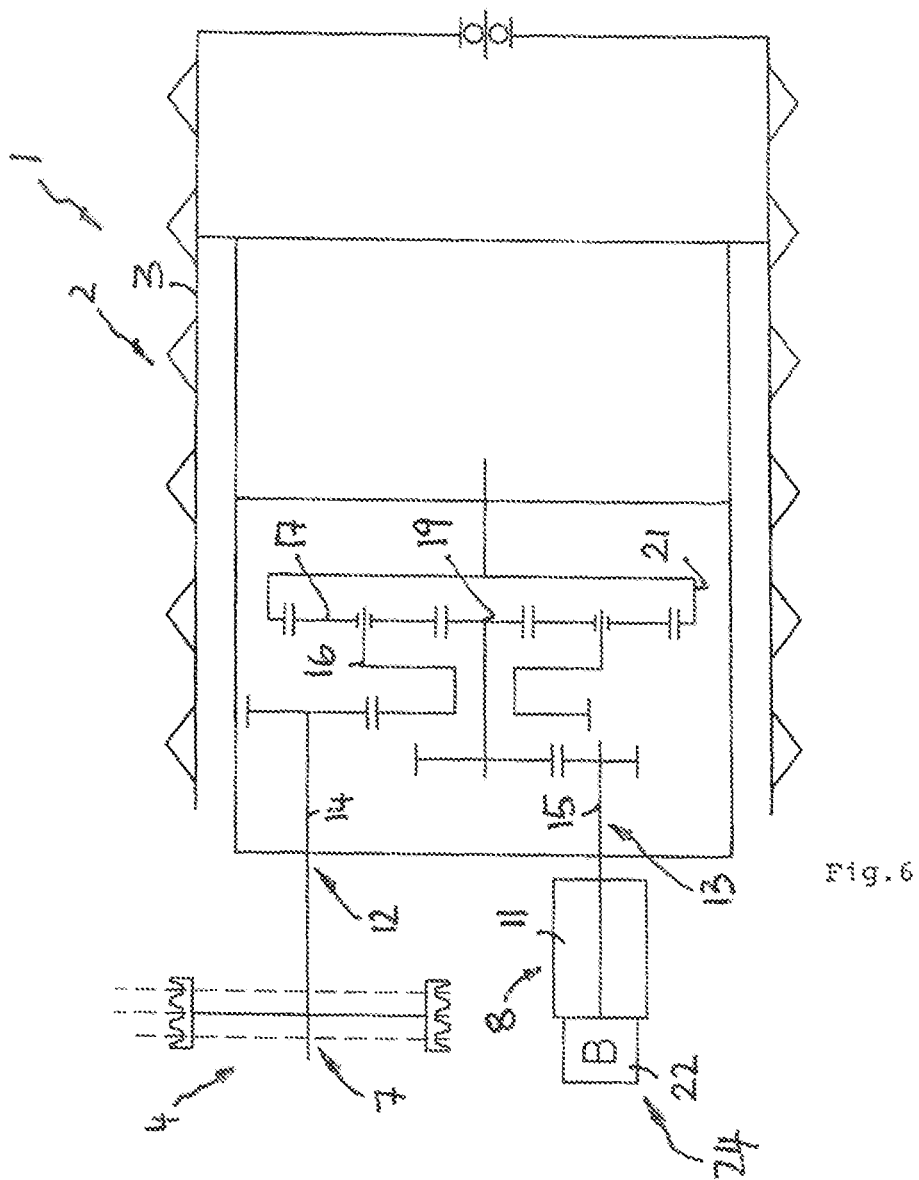
FIG. 6 is a sectional, schematic representation of the rotary cutter of a surface cutter similar to FIG. 5, with a brake for stopping the summation transmission train drive-connected to the electric or hydraulic power branch being connected to the energy converter of the electric or hydraulic power branch.

Such a brake can also be integrated in or associated with the energy converter 11, for example in the form of a brake 22 directly provided at an electric motor that acts as an energy converter 11, as FIGS. 5 and 6 show. The brake 22 here be connected to the power input shaft 15 to which the energy converter 11 is drive-connected or also to an outlet shaft of the energy converter 11, optionally also to a converter transmission shaft of a converter output transmission, cf. FIG. 5. Alternatively, the brake 22 can here also be seated directly at the energy converter 11, for example at the motor shaft of an electric motor at the side of the electric motor disposed opposite the power input shaft 15, cf. FIG. 6.

The brake 22 can here be configured as a friction brake, for example in the form of a multi-disk brake, or also as a shape-matched brake, for example in the form of a jaw clutch or of a claw brake.

Figure 3:
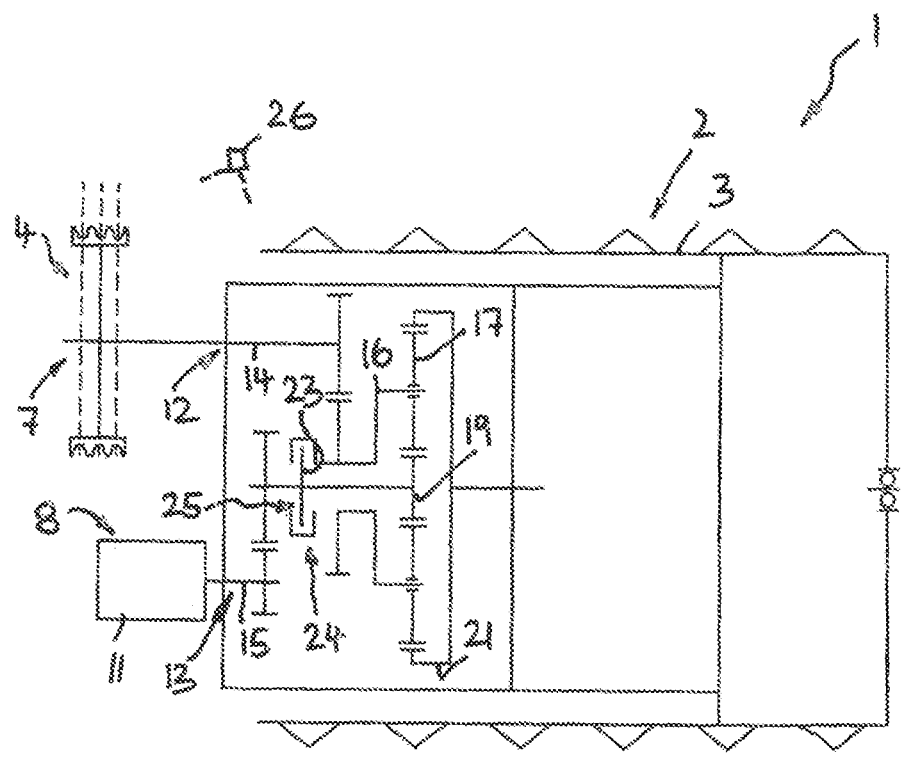
FIG. 3 is a sectional, schematic representation of the rotary cutter of a surface cutter and of the summation transmission received therein similar to the preceding Figures, with the two power input trains being able to be fixedly coupled to one another by a clutch.

As FIG. 3 shows, the sun gear 19 can also be rotationally fixedly connected to the web 16, with here a clutch 23 being able to be provided between the web 16 and the sun gear 19 to couple the two power input trains 12 and 13 rotationally fixedly to one another. The clutch 23 could, however, also couple two other transmission elements or transmission trains of the summation transmission to stop the variability of the translation ratio, with one of the transmission trains to be coupled being able to be drive-connected to the electric/hydraulic power branch and the other being able to be drive-connected to the mechanical power branch so that the electric/hydraulic branch runs along with the mechanical branch.

The brake 22 and the clutch 23 are each part of a blocking apparatus 24 by means of which the transmission ratio between the mechanical first power branch 7 and the output side of the summation transmission 9 can be set to drive the working assembly 2 at a fixed transmission from the internal combustion engine 5.

The brake 22 and/or the clutch 23 can here be configured as manually and/or semi-automatically and/or fully automatically actuable. A control apparatus 26 can advantageously be provided for actuating the blocking apparatus 24 comprising the brake 22 or the clutch 23 that can operate in dependence on the rotational speed of the working rotor 3 and/or in dependence on the rotational speed of the internal combustion engine 5.

The electric or hydraulic second power branch 8 can in particular then be bridged by closing the brake 22 or by closing the clutch 23 when the working speed of the working assembly 2 is in a range 27 in which a higher drive torque can be implemented at the working assembly 2 by a purely mechanical power transfer from the internal combustion engine 5, that is with a closed brake 22 and/or with a closed clutch 23 or at a fixed transmission between the internal combustion engine and the working assembly, than with a switched-in power split or with a division of the drive power to the mechanical and/or electric power branches.

The control apparatus 26 can in particular activate the blocking apparatus 34, that is, can close the brake 22 or the clutch 23, when the required rotor rotational speed of the working rotor 3 can be reached by an internal combustion engine rotational speed that is in a range of the rotational speed curve of the internal combustion engine favorable for torque and/or for consumption and can be converted into the desired working rotor rotational speed by the fixed speed-increase/speed-decrease ratio that the summation transmission 9 has with a blocked blocking apparatus 24.

Figure 4:
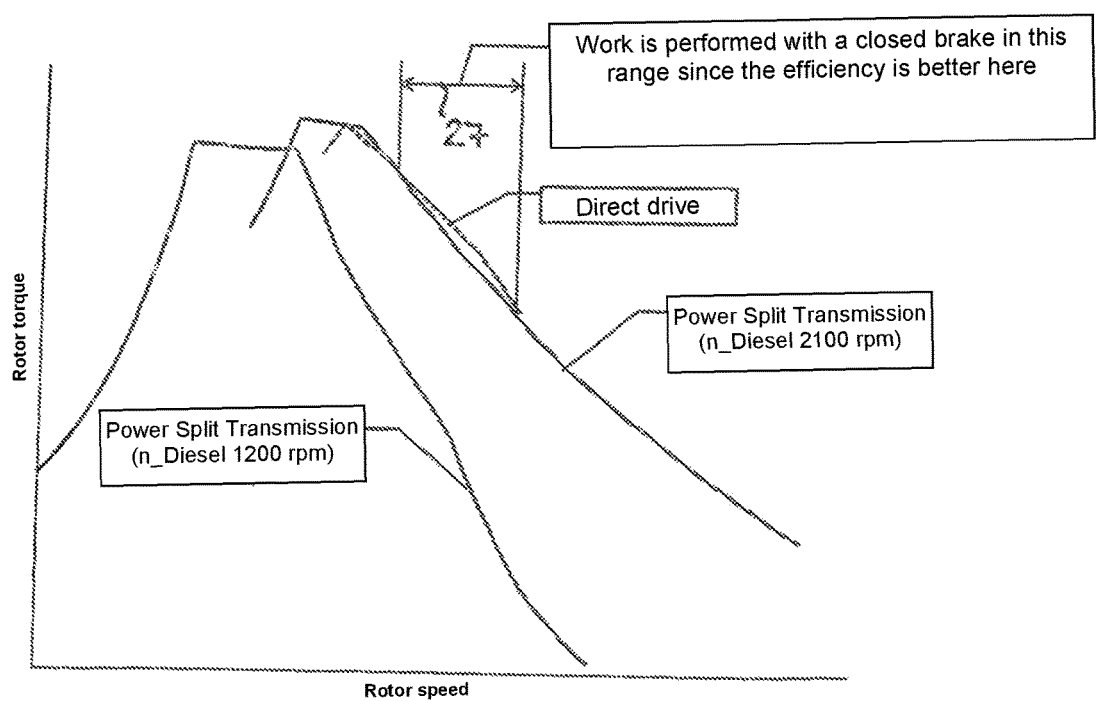
FIG. 4 is a comparative representation of the course of the rotor torque over the rotor rotational speed, with the torque course being shown with power split, that is with an open brake and/or an open clutch, by a solid line, on the one hand, and the torque course being shown with a closed brake and/or a closed clutch or with a bridged hydraulic power branch by a dashed line, on the other hand.

With a fully automatic configuration of the control apparatus 26, the latter actuates the brake 22 or the clutch 23 when the working rotor 3 is in the rotational speed range 27, cf. FIG. 4. With a semi-automatic configuration, a signal can be output, for example on a display apparatus, to the machine operator who can then trigger the actuation of the blocking apparatus 24.

The invention claimed is:

1. A working machine having a working assembly that is drivable by an engine configured to be connected to the working assembly via a power split transmission comprising a first power branch and a second power branch;
    wherein the first and second power branches are combined by a summation transmission that is couplable to the working assembly at an output side;
    wherein a variable transmission ratio between the first power branch and the output side is configured to be set by a summation transmission input rotational speed that is configured to be provided by the second power branch;
    wherein a blocking apparatus is provided for blocking the variability of the transmission ratio by the second power branch;
    wherein the first power branch is a mechanical power branch;
    wherein the second power branch is selected from the group consisting of an electric power branch and a hydraulic power branch; and
    wherein the summation transmission is integrated into the working assembly.

2. The working machine in accordance with claim 1, wherein the blocking apparatus has holding means for stopping a summation transmission train to which the second power branch is connected.

3. The working machine in accordance with claim 2, wherein the holding means have a brake for stopping the summation transmission input train to which the second power branch is connected.

4. The working machine in accordance with claim 1, wherein the blocking apparatus has holding means for fixedly coupling a summation transmission train to the second power branch and is drive-connected to a further gear train to which the first power branch is connected.

5. The working machine in accordance with claim 4, wherein the holding means have a clutch for a rotationally fixed coupling of the summation transmission input train to which the second power branch is connected to the further gear input train to which the first power branch is connected.

6. The working machine in accordance with claim 1, wherein the summation transmission has a planetary transmission.

7. The working machine in accordance with claim 6, wherein the first power branch is drive-connected to a web of the planetary transmission and the second power branch is drive-connected to a sun gear that is in rolling engagement with planetary gears of the planetary transmission, with a ring gear in rolling engagement with the planetary gears forming an output side of the planetary transmission.

8. The working machine in accordance with claim 7, wherein the holding means have a brake for stopping the summation transmission input train to which the second power branch is connected; and
wherein the sun gear is directly or indirectly blockable by the brake.

9. The working machine in accordance with claim 7, wherein the holding means have a clutch for a rotationally fixed coupling of the summation transmission input train to which the second power branch is connected to the further gear input train to which the first power branch is connected; and
wherein the sun gear and the web are blockable with respect to one another by the clutch.

10. The working machine in accordance with claim 1, wherein a control apparatus is provided for automatic actuation of the blocking apparatus in dependence on the working speed of the working assembly.

11. The working machine in accordance with claim 10, wherein the control apparatus is configured such that the blocking apparatus blocks the transmission ratio of the summation transmission when the working speed of the working assembly is in a predefined range and the rotational speed of the engine is in a corresponding predefined range at the blocked, fixed increased-speed/decreased-speed ratio.

12. The working machine in accordance with claim 1, wherein the second power branch comprises a hydrostat.

13. The working machine in accordance with claim 1, wherein a control apparatus is provided for automatic actuation of the blocking apparatus in dependence on the rotational speed of the engine.

14. The working machine in accordance with claim 1, wherein the summation transmission is received in an inner space of the working assembly formed as a cylindrical, elongate working rotor.

15. A working machine having a working assembly that is drivable by an engine configured to be connected to the working assembly via a power split transmission comprising a first power branch and a second power branch;
wherein the first and second power branches are combined by a summation transmission that is couplable to the working assembly at an output side;
wherein a variable transmission ratio between the first power branch and the output side is configured to be set by a summation transmission input rotational speed that is configured to be provided by the second power branch;
wherein a blocking apparatus is provided for blocking the variability of the transmission ratio by the second power branch;
wherein the first power branch is a mechanical power branch;
wherein the second power branch is selected from the group consisting of an electric power branch and a hydraulic power branch; and
wherein the working machine is self-propelling and the engine forms a traction drive.

16. The working machine in accordance with claim 15, wherein the blocking apparatus has holding means for stopping a summation transmission train to which the second power branch is connected.

17. The working machine in accordance with claim 16, wherein the holding means have a brake for stopping the summation transmission input train to which the second power branch is connected.

18. The working machine in accordance with claim 15, wherein the blocking apparatus has holding means for fixedly coupling a summation transmission train to the second power branch and is drive-connected to a further gear train to which the first power branch is connected.

19. The working machine in accordance with claim 18, wherein the holding means have a clutch for a rotationally fixed coupling of the summation transmission input train to which the second power branch is connected to the further gear input train to which the first power branch is connected.

20. The working machine in accordance with claim 15, wherein the summation transmission has a planetary transmission.

21. The working machine in accordance with claim 15, wherein the summation transmission is received in an inner space of the working assembly formed as a cylindrical, elongate working rotor.

22. The working machine in accordance with claim 15, wherein a control apparatus is provided for automatic actuation of the blocking apparatus in dependence on the working speed of the working assembly.

23. The working machine in accordance with claim 22, wherein the first power branch is drive-connected to a web of the planetary transmission and the second power branch is drive-connected to a sun gear that is in rolling engagement with planetary gears of the planetary transmission, with a ring gear in rolling engagement with the planetary gears forming an output side of the planetary transmission.

24. The working machine in accordance with claim 23, wherein the holding means have a brake for stopping the summation transmission input train to which the second power branch is connected; and
wherein the sun gear is directly or indirectly blockable by the brake.

25. The working machine in accordance with claim 23, wherein the holding means have a clutch for a rotationally fixed coupling of the summation transmission input train to which the second power branch is connected to the further gear input train to which the first power branch is connected; and
wherein the sun gear and the web are blockable with respect to one another by the clutch.

26. The working machine in accordance with claim 22, wherein the control apparatus is configured such that the blocking apparatus blocks the transmission ratio of the summation transmission when the working speed of the working assembly is in a predefined range and the rotational speed of the engine is in a corresponding predefined range at the blocked, fixed increased-speed/decreased-speed ratio.

27. The working machine in accordance with claim 15, wherein a control apparatus is provided for automatic actuation of the blocking apparatus in dependence on the rotational speed of the engine.

28. A working machine having a working assembly that is drivable by an engine configured to be connected to the working assembly via a power split transmission comprising a first power branch and a second power branch;

wherein the first and second power branches are combined by a summation transmission that is couplable to the working assembly at an output side;

wherein a variable transmission ratio between the first power branch and the output side is configured to be set by a summation transmission input rotational speed that is configured to be provided by the second power branch;

wherein a blocking apparatus is provided for blocking the variability of the transmission ratio by the second power branch;

wherein the first power branch is a mechanical power branch; and wherein the second power branch comprises an adjustable hydrostat as an energy converter that is arranged together with the summation transmission in the interior of the working assembly.

29. The working machine in accordance with claim 28, wherein the blocking apparatus has holding means for stopping a summation transmission train to which the second power branch is connected.

30. The working machine in accordance with claim 29, wherein the holding means have a brake for stopping the summation transmission input train to which the second power branch is connected.

31. The working machine in accordance with claim 28, wherein the blocking apparatus has holding means for fixedly coupling a summation transmission train to the second power branch and is drive-connected to a further gear train to which the first power branch is connected.

32. The working machine in accordance with claim 31, wherein the holding means have a clutch for a rotationally fixed coupling of the summation transmission input train to which the second power branch is connected to the further gear input train to which the first power branch is connected.

33. The working machine in accordance with claim 28, wherein the summation transmission has a planetary transmission.

34. The working machine in accordance with claim 33, wherein the first power branch is drive-connected to a web of the planetary transmission and the second power branch is drive-connected to a sun gear that is in rolling engagement with planetary gears of the planetary transmission, with a ring gear in rolling engagement with the planetary gears forming an output side of the planetary transmission.

35. The working machine in accordance with claim 34, wherein the holding means have a brake for stopping the summation transmission input train to which the second power branch is connected; and wherein the sun gear is directly or indirectly blockable by the brake.

36. The working machine in accordance with claim 34, wherein the holding means have a clutch for a rotationally fixed coupling of the summation transmission input train to which the second power branch is connected to the further gear input train to which the first power branch is connected; and wherein the sun gear and the web are blockable with respect to one another by the clutch.

37. The working machine in accordance with claim 28, wherein a control apparatus is provided for automatic actuation of the blocking apparatus in dependence on the working speed of the working assembly.

38. The working machine in accordance with claim 37, wherein the control apparatus is configured such that the blocking apparatus blocks the transmission ratio of the summation transmission when the working speed of the working assembly is in a predefined range and the rotational speed of the engine is in a corresponding predefined range at the blocked, fixed increased-speed/decreased-speed ratio.

39. The working machine in accordance with claim 28, wherein a control apparatus is provided for automatic actuation of the blocking apparatus in dependence on the rotational speed of the engine.

40. The working machine in accordance with claim 28, wherein the summation transmission is received in an inner space of the working assembly formed as a cylindrical, elongate working rotor.

* * * * *